United States Patent
Takemura et al.

(10) Patent No.: US 12,032,098 B2
(45) Date of Patent: Jul. 9, 2024

(54) SENSOR CONTROL DEVICE

(71) Applicant: PIONEER CORPORATION, Tokyo (JP)

(72) Inventors: Itaru Takemura, Kawagoe (JP); Makoto Matsumaru, Kawagoe (JP); Hiroshi Nagata, Kawagoe (JP); Yugo Ishikawa, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 895 days.

(21) Appl. No.: 16/981,220

(22) PCT Filed: Mar. 14, 2019

(86) PCT No.: PCT/JP2019/010494
§ 371 (c)(1),
(2) Date: Sep. 15, 2020

(87) PCT Pub. No.: WO2019/177088
PCT Pub. Date: Sep. 19, 2019

(65) Prior Publication Data
US 2021/0048514 A1 Feb. 18, 2021

(30) Foreign Application Priority Data

Mar. 15, 2018 (JP) ................................. 2018-047577

(51) Int. Cl.
*G01S 7/48* (2006.01)
*G01S 7/486* (2020.01)
(Continued)

(52) U.S. Cl.
CPC ............ *G01S 7/4868* (2013.01); *G01S 7/489* (2013.01); *G01S 17/89* (2013.01); *G01S 17/931* (2020.01)

(58) Field of Classification Search
None
See application file for complete search history.

(56) References Cited

U.S. PATENT DOCUMENTS

2013/0009760 A1* 1/2013 Washlow ........... G01C 21/3415
340/425.5
2017/0227647 A1 8/2017 Baik

FOREIGN PATENT DOCUMENTS

GB 2044035 A * 10/1980 ........... G01S 17/936
JP H07-191148 A 7/1995
(Continued)

OTHER PUBLICATIONS

European Patent Office, Extended European Search Report, Application No. 19767779.2-1206, dated Nov. 15, 2021, in 8 pages.
(Continued)

*Primary Examiner* — Hovhannes Baghdasaryan
(74) *Attorney, Agent, or Firm* — PROCOPIO, CORY, HARGREAVES & SAVITCH LLP

(57) ABSTRACT

An accuracy of detection of a road surface or the like is improved even in a state where a peak power of reflected light is low. A sensor control device is configured to be mounted in a vehicle capable of acquiring a current location and configured to control a LiDAR-having a light source which emits light to a predetermined region and a light receiving element which receives reflected light of the emitted light, and the sensor control device includes an adjustment unit which acquires map information and adjusts a light receiving level of a light receiving signal of the light receiving element. The adjustment unit determines, based on the map information, a region for which the light receiving level with respect to the light receiving signal is to be adjusted.

4 Claims, 5 Drawing Sheets

(51) Int. Cl.
  *G01S 7/489*   (2006.01)
  *G01S 17/89*   (2020.01)
  *G01S 17/931*  (2020.01)

(56) References Cited

FOREIGN PATENT DOCUMENTS

| | | |
|---|---|---|
| JP | 2006220479 A | 8/2006 |
| JP | 2016176750 A | 10/2016 |
| WO | 2018091970 A1 | 5/2018 |

OTHER PUBLICATIONS

Japanese Patent Office, Notice of Reasons for Refusal, Application No. JP2020-506639, dated Aug. 26, 2021.

\* cited by examiner

SENSOR CONTROL DEVICE

CROSS-REFERENCE TO RELATED APPLICATIONS

This application is a S. National Stage entry of PCT Application No. PCT/JP2019/010494, filed on Mar. 14.2019, which claims priority to JP Application No. 2018-047577, filed Mar. 15, 2018. The contents of the foregoing are incorporated by reference.

TECHNICAL FIELD

This invention relates to a sensor control device which controls a sensor such as a LiDAR (LiDAR: Light Detection And Ranging).

BACKGROUND ART

In recent years, a LiDAR is used as a sensor for detecting an obstacle or a road surface in the surroundings of a mobile object such as a vehicle in ADAS (Advanced Driver Assistance Systems) or autonomous driving or the like. The LiDAR is the sensor which detects an obstacle or the like existing in front of the mobile object by, for example, emitting a laser beam in front of the mobile object and receiving reflected light from an object existing in the front of the mobile object (for example, refer to Patent Document 1).

The LiDAR detects an object such as an obstacle or the like by receiving reflected light of the emitted laser beam. Therefore, for an obstacle or the like on a road, since an incident angle of the laser beam is almost perpendicular, a peak power of the reflected light is sufficiently obtained, however, in a case of a road surface itself, since an incident angle of the laser beam is small, the peak power of the reflected light is low. Thus, the farther the road surface is located, the more difficult a detection of the road surface becomes.

In view of this, Patent Document 2 proposes a method including correcting a deviation amount of TOF between nearby-arranged TOF pixels GT and combining light receiving signals from a plurality of TOF pixels GT, by which, in a case where a measuring object is the road surface, peak values of the light receiving signals are added together and the light receiving signal is further increased, thereby further increasing a S/N ratio of the light receiving signal

CITATION LIST

Patent Documents

[Patent Document 1] Japanese Unexamined Patent Application Publication No. 2006-220479
[Patent Document 2] Japanese Unexamined Patent Application Publication No. 2016-176750

SUMMARY OF THE INVENTION

Technical Problem

In a case of the method described in Patent Document 2, a plurality of TOF pixels or a plurality of reference pixels as light receiving elements are necessary. Therefore, the method cannot be applied in a case of a configuration in which, for example, pulsed light is emitted so as to scan a predetermined range and reflected light of each pulsed light is sequentially received by one light receiving element.

An example of the problem to be solved by the present invention is to improve an accuracy for detection of a road surface or the like even in a state where a peak power of reflected light is low.

Solution to Problem

In order to solve the problem mentioned above, the invention defined in claim 1 is a sensor control device configured to be mounted in a mobile object capable of acquiring a current location and an orientation and configured to control a sensor having an emitting unit which emits light toward a predetermined region and a light receiving unit which receives reflected light of the emitted light, the sensor control device including a map information acquiring unit acquiring map information corresponding to the current location and the orientation, and an adjustment unit adjusting a light receiving level of a light receiving signal of the light receiving unit, in which, based on the map information, the adjustment unit determines a region for which the light receiving level with respect to the light receiving signal is to be adjusted.

The invention defined in claim 5 is a sensor control method executed by a sensor control device, the sensor control device being mounted in a mobile object capable of acquiring a current location and an orientation and configured to control a sensor having an emitting unit which emits light toward a predetermined region and a light receiving unit which receives reflected light of the emitted light, the sensor control method including a map information acquiring step of acquiring map information corresponding to the current location and the orientation, and an adjustment step of adjusting a light receiving level of a light receiving signal of the light receiving unit, in which the adjustment step determines, based on the map information, a region for which the light receiving level with respect to the light receiving signal is to be adjusted.

The invention defined in claim 6 causes a computer to execute the sensor control method defined in claim 5.

DESCRIPTION OF EMBODIMENTS

Figure 1:
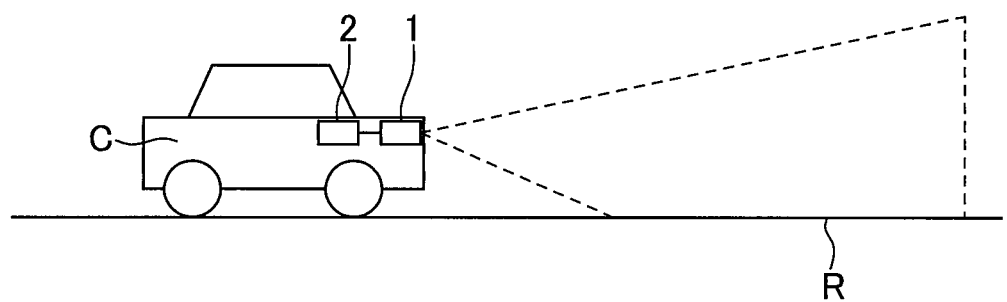
FIG. 1 is an explanatory drawing illustrating that a sensor control device according to one example of the present invention and a LiDAR are mounted in a vehicle.

A sensor control device according to one embodiment of the present invention will be explained below. The sensor control device according to the one embodiment of the present invention is configured to be mounted in a mobile object capable of acquiring a current location and an orientation and configured to control a sensor having an emitting unit which emits light toward a predetermined region and a light receiving unit which receives reflected light of the emitted light, the sensor control device including a map information acquiring unit acquiring map information corresponding to the current location and the orientation, and an adjustment unit adjusting a light receiving level of a light receiving signal of the light receiving unit. Further, the adjustment unit determines a region for which the light receiving level with respect to the light receiving signal is to be adjusted based on the map information. Thus, the light receiving level can be adjusted for a region corresponding to a road in the predetermined region to which the light is emitted based on the map information. Therefore, an accuracy of detection can be improved even in a state where a peak power of reflected light of a road surface or the like is low.

Further, the adjustment unit may adjust the light receiving level of the light receiving signal with respect to a region estimated to be a road based on the map information. Thus, for the region estimated to be the road according to the map information in the predetermined region irradiated with the light, the light receiving level can be adjusted to be raised, for example. That is, practically, light receiving sensitivity of the region estimated to be the road can be increased, thus an accuracy of detection of the road surface or the like can be improved.

Further, the adjustment unit may adjust the light receiving level based on a light receiving amount of the light receiving unit with respect to at least a portion of the region for which the light receiving level is adjusted based on the map information. Thus, for example, in a case where another vehicle or the like is detected with respect to the region estimated to be the road, the light receiving level can be adjusted to be lowered so it is not saturated for the region where another vehicle or the like was detected.

Further, the sensor control method according to the one embodiment of the present invention is a sensor control method which is executed by a sensor control device, the sensor control device being mounted in a mobile object capable of acquiring a current location and an orientation and configured to control a sensor having an emitting unit which emits light toward a predetermined region and a light receiving unit which receives reflected light of the emitted light, the sensor control method including a map information acquiring step of acquiring map information corresponding to the current location and the orientation; and an adjustment step of adjusting a light receiving level of a light receiving signal of the light receiving unit. The adjustment step determines, based on the map information, a region for which the light receiving level with respect to the light receiving signal is to be adjusted. Thus, the light receiving level can be adjusted for the region corresponding to a road in the predetermined region irradiated with the light based on the map information. Therefore, an accuracy of detection can be improved even in a state where a peak power of reflected light of a road surface or the like is low.

In addition, the above-mentioned sensor control method may be executed by a computer. Thus, using the computer, the light receiving level can be adjusted for the region corresponding to the road in the predetermined region irradiated with the light based on the map information. Therefore, an accuracy of detection can be improved even in a state where a peak power of reflected light of a road surface or the like is low.

Examples

A sensor control device according to one example of the present invention is described with reference to FIGS. 1 to 6. A sensor control device 2 is mounted in, for example, a vehicle C as a mobile object as shown in FIG. 1. The sensor control device 2 adjusts a light receiving level of a LiDAR 1 as a sensor mounted in the vehicle C.

The LiDAR 1 emits light to a region shown by broken lines (predetermined region) and detects a road surface R or an obstacle or the like on a road by receiving the reflected light. A configuration of the LiDAR 1 is shown in FIG. 2.

Figure 2:
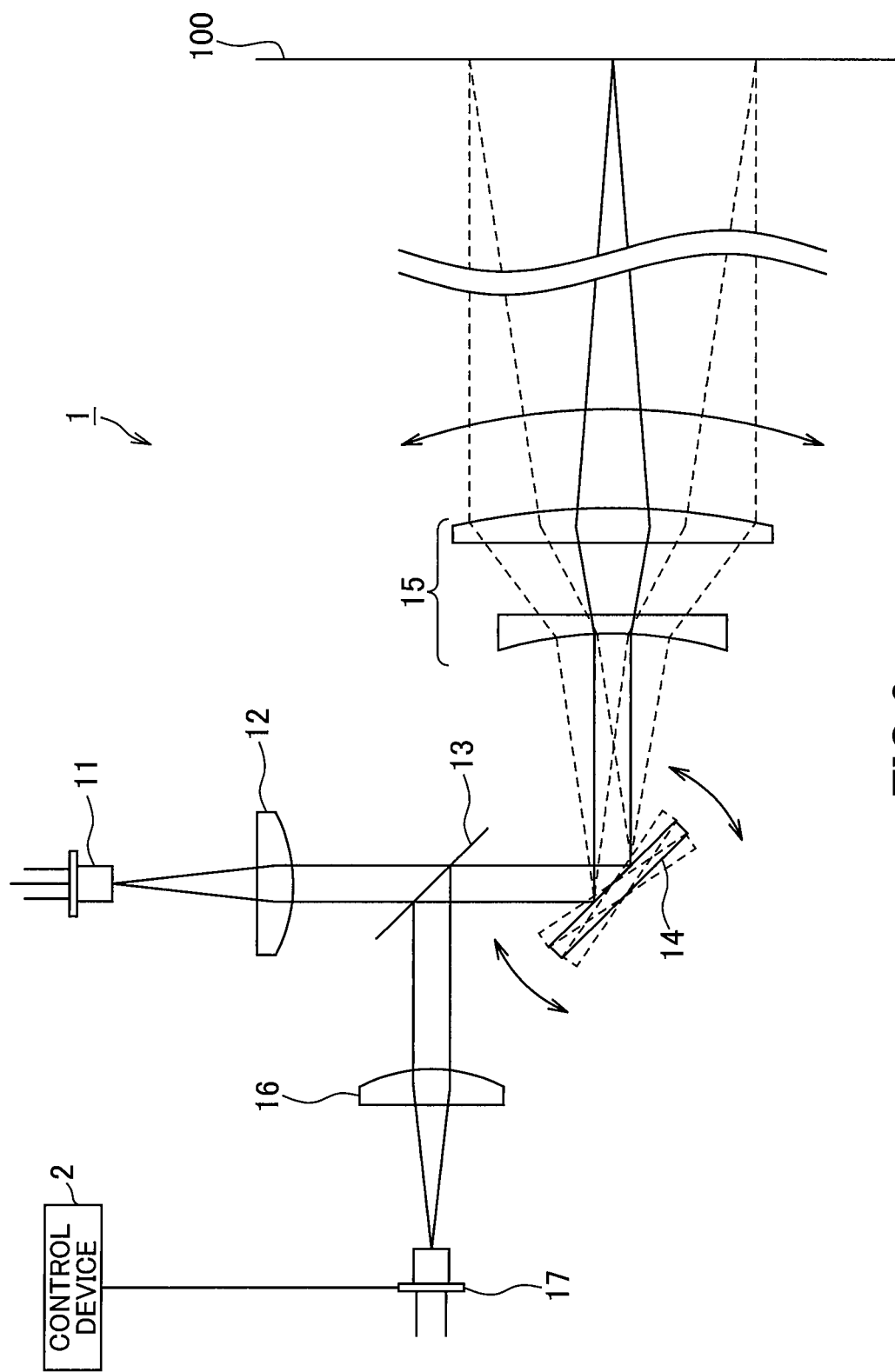
FIG. 2 is an explanatory drawing illustrating a configuration example of the LiDAR shown in FIG. 1.

The LiDAR 1 includes, as shown in FIG. 2, a light source 11, a collimate lens 12, a beam splitter 13, a MEMS mirror 14, a light projecting and receiving lens 15, a collecting lens 16, and a light receiving element 17.

The light source 11 as an emitting unit is constituted with, for example, a laser diode. The light source 11 emits (irradiates with) a laser beam having a predetermined wavelength in a pulsated manner.

The collimate lens 12 makes the laser beam emitted from the light source 11 a parallel beam. The beam splitter 13 outputs the laser beam which was changed to parallel light by the collimate lens 12 to the MEMS mirror 14, and reflects incident light reflected by the MEMS mirror 14 toward the collecting lens 16.

The MEMS mirror 14 directs the laser beam emitted from the beam splitter 13 to a region where an object 100 exists to perform scan in the horizontal direction and the vertical direction. Here, the object 100 is the road surface R shown in FIG. 1 or a not-shown obstacle or the like. Further, the MEMS mirror 14 reflects incident light which is light reflected by the object 100 and became incident on the light projecting and receiving lens 15, to the beam splitter 13. The MEMS mirror 14 is a mirror which is constituted by MEMS (Micro Electro Mechanical Systems), and is driven by an actuator (not shown) formed integrally with the mirror. The MEMS mirror 14 may be other beam deflection means such as a galvanometer mirror or a polygon mirror.

The light projecting and receiving lens 15 emits (projects) the laser beam reflected by the MEMS mirror 14 toward the region where an object 10 exists. Further, reflected light or the like which is the laser beam reflected by the object 100 is made incident on (received by) the light projecting and receiving lens 15.

The collecting lens 16 is provided between the beam splitter 13 and the light receiving element 17, and collects the reflected light reflected on the beam splitter 13 at the light receiving element 17.

The light receiving element 17 as the light receiving unit receives the reflected light collected by the collecting lens 16. The light receiving element 17 is constituted with, for example, one (single pixel) avalanche photodiode (APD). The light receiving element 17 outputs a signal (light receiving signal) having a level corresponding to intensity of the received light.

As is well known, the LiDAR 1 can acquire a state of the object 100 in a scanning region as a point group by intermittently emitting the laser beam to the predetermined region so as to scan the predetermined region.

Figure 3:
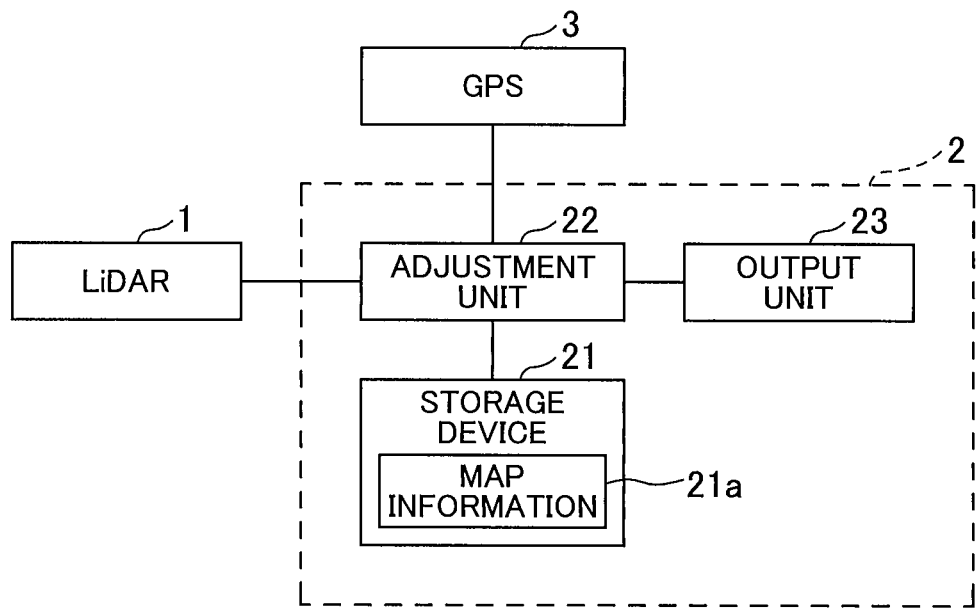
FIG. 3 is a functional configuration diagram of the sensor control device shown in FIG. 1.

A functional configuration of the sensor control device 2 is shown in FIG. 3. As shown in FIG. 3, the sensor control device 2 includes a storage device 21, an adjustment unit 22, and an output unit 23.

The storage device 21 is constituted with, for example, a nonvolatile storage media such as semiconductor memory or a hard disc or the like. Map information 21a is stored in the storage device 21. The map information 21 is configured as, for example, a three-dimensional map which is generated based on the point group acquired by the LiDAR 1 mentioned above. Further, road surface information such as information of a road network or a lane network, a curvature of a curve of a road and/or an inclination angle of a road surface is included in the map information 21. In addition, information regarding a feature such as a location or the like of the feature such as a signage or a traffic signal, a guardrail, a road marking, or a building is included in the map information 21. Further, the map information 21 may include information regarding reflection characteristics of an object such as BRDF (Bidirectional Reflectance Distribution Function) for each feature.

The adjustment unit 22 adjusts the light receiving level of the light receiving signal inputted from the LiDAR 1 to the adjustment unit 22 based on the map information 21a stored in the storage device 21. The adjustment unit 22 identifies an area which should be acquired from the map information 21a based on current location information inputted from a GPS receiver 3 shown in FIG. 2. The adjustment unit 13 is constituted with, for example, a microcomputer having a CPU (Central Processing Unit) or the like.

The output unit 23 outputs the light receiving signal adjusted by the adjustment unit 22 to, for example, a control device of ADAS or autonomous driving or the like.

The GPS receiver 3 is a well-known apparatus which detects a current location of the vehicle C based on a radio wave from a GPS (Global Positioning System) satellite. Further, not only the GPS receiver 3 but a gyro sensor which detects an attitude such as an orientation of the vehicle C or the like may be connected to the sensor control device 2. In addition, the orientation of the vehicle may be judged based on a history of the current location detected not only by the gyro sensor but by the GPS receiver 3.

Figure 4:
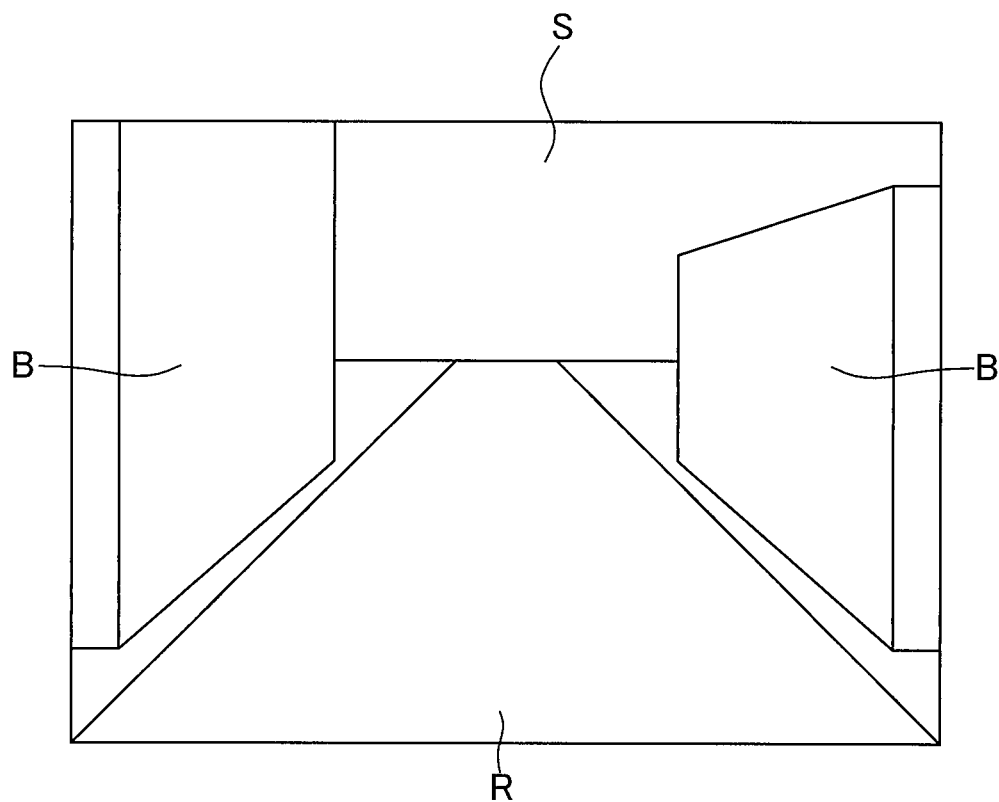
FIG. 4 is an explanatory drawing illustrating a state in which a predetermined region in a traveling direction is scanned from the LiDAR of a vehicle traveling on a straight road.

Next, an adjusting method of the light receiving level of the light receiving signal of the LiDAR 1 in the sensor control device 2 of the above-mentioned configuration is described with reference to FIG. 4. FIG. 4 is a drawing illustrating a state in front of the vehicle acquired as a result of scanning a predetermined region (detection region) in a traveling direction from the LiDAR 1 of the vehicle C traveling on a straight road, for example. As shown in FIG. 4, the LiDAR 1 detects a road surface (road) R in a central portion on a substantially lower side of the detection region, and detects a building B built along the road. Further, a substantially upper side of the detection region is detected as a space S above the road surface R since no reflected light is detected.

Here, for the building B, a peak power of the reflected light can be obtained sufficiently since an incident angle of a laser beam emitted from the LiDAR 1 thereto is substantially perpendicular, however, with respect to a portion of the road surface R, there is a case where a peak power of the reflected light cannot be obtained sufficiently since an incident angle of the laser beam is small.

Then, referring to the map information 21a, a region of the road surface R out of the irradiated region irradiated with the laser beam of the LiDAR 1 is estimated, and the light receiving level of the light receiving signal based on the reflected light from the region estimated to be the road surface R is adjusted to be higher than that of other regions. Specifically, a gain with respect to the light receiving signal outputted by the light receiving element 17 is amplified to be higher than that of other regions. Thus, practically, a sensitivity of the light receiving element 17 with respect to the region estimated to be the road surface R can be increased more than that of other regions.

Figure 5:
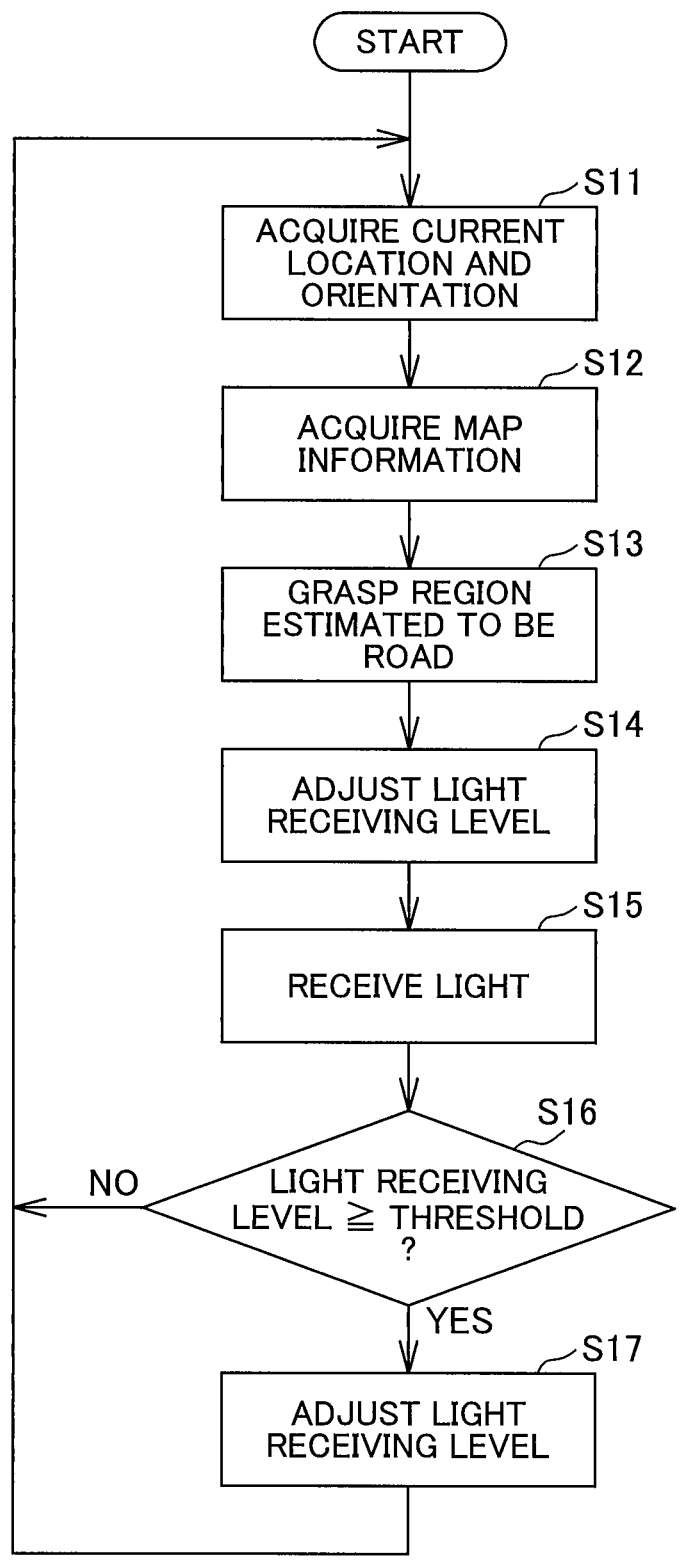
FIG. 5 is a flowchart of a sensor control method in an adjustment unit shown in FIG. 3.

The method of adjusting the light receiving level of the light receiving signal of the LiDAR 1 (sensor control method) in the above-mentioned sensor control device 2 is described below with reference to a flowchart of FIG. 5. The flowchart of FIG. 5 is executed by the adjustment unit 22. That is, by configuring the flowchart of FIG. 5 as a computer program executed by the CPU of the adjustment unit 22, the flowchart can be a sensor control program.

First, in step 11, a current location and an orientation (traveling direction) of the vehicle C are acquired from the GPS receiver 3 and/or the gyro sensor.

Next, in step 12, the map information 21a is acquired from the storage device 21 based on the current location and the orientation of the vehicle C acquired in the step S11. That is, map information of an area in the traveling direction is read out from the storage device 21 based on the current location of the vehicle C. In other words, the adjustment unit 22 functions as a map information acquiring unit acquiring the map information.

Then, in step 13, a region estimated to be a road from the detection region of the LiDAR 1 is grasped based on the map information acquired in the step S12. That is, the region of the road surface R shown in FIG. 4 is determined.

Then, in step S14, a light receiving level with respect to the region estimated to be the road which was grasped in the step S13 is adjusted. Specifically, as described above, a gain is changed so that the light receiving level becomes higher than that of other regions. The light receiving level is not changed (no change of gain) with respect to a region other than the region estimated to be the road. In other words, the adjustment unit 13 functions as an adjustment unit adjusting a light receiving level of a light receiving signal of the light receiving unit based on the map information.

Then, in step S15, the reflected light is received at the light receiving level adjusted in the step S14. Of course, for a region for which the light receiving level is not adjusted (for example, the building B or the like), the light is received at the light receiving level which is not adjusted (at a default value).

Then, in step S16, it is judged whether the light receiving level of the region adjusted in the step S14 out of the light receiving level received in the step S15 was equal to or greater than a predetermined threshold or not, and if the light receiving level was equal to or greater than the predetermined threshold (case of "YES"), then, in step S17, the light receiving level is adjusted with respect to a portion in the detection region for which the light receiving level which was equal to or greater than the predetermined threshold was observed. This adjustment is performed so as to lower the light receiving level. Specifically, the gain is adjusted to be lowered with respect to the light receiving signal outputted by the light receiving element 17. The amount of lowering the gain may be only a predetermined amount determined in advance, or, the gain may be returned back to the value before being raised by the adjustment. Further, the predetermined threshold may be appropriately determined within a range in which the light receiving level is not saturated (for example, right before saturation or the like).

A case where this step S17 is performed is, for example, a case where an obstacle such as another vehicle or the like is detected when the laser beam is emitted to the region of the road surface R. In such a case, since the incident angle with respect to the obstacle or the like is substantially perpendicular as described above and the peak power of the reflected light can be sufficiently obtained, there is no need to raise the gain. Thus, the gain is adjusted to be lowered with respect to a portion in the detection region for which the light receiving level which is equal to or greater than the predetermined threshold was detected.

On the other hand, in the step S16, if the light receiving level is less than the predetermined threshold (case of "NO"), then the step S17 is not performed and the flowchart returns back to the step S11.

As it is clear from the explanation above, the step S11 functions as a map information acquiring step and the step S14 functions as an adjusting step.

The above-mentioned flowchart returns back to the step S11 again after the step S17 is performed. Therefore, when returned back to the step S11, the map information 21a is acquired again based on the current location and the orientation (traveling direction) of the vehicle C (steps S11 and S12), and the light receiving level is adjusted based on the map information 21a which was acquired again (steps S13 and S14).

Figure 6:
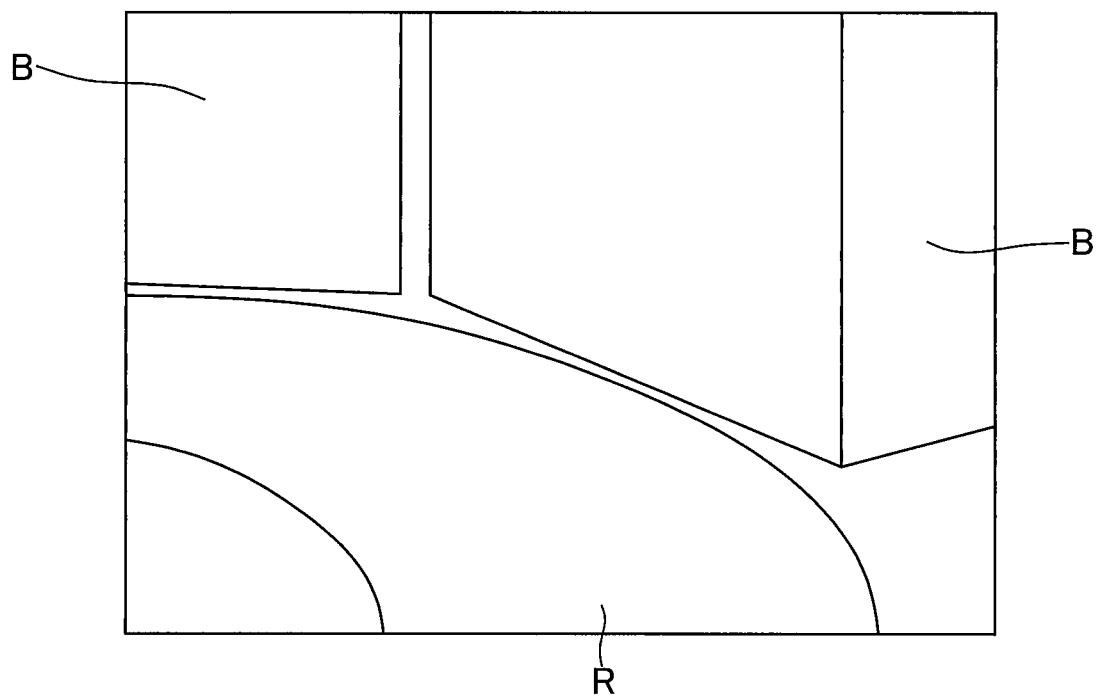
FIG. 6 is an explanatory drawing illustrating a state in which a predetermined region in a traveling direction is scanned from the LiDAR in a case where a road is curved.

As a specific example, assume that a road ahead was found to be curved from the map information when the vehicle C was traveling while performing the flowchart of FIG. 5. In such a case, as shown in FIG. 6, the region of the road surface R changes from a state shown in FIG. 4, and a region estimated to be the road surface R in FIG. 4 may become the building B in FIG. 6. In a case like this, if the gain of a region which became the building B remains the same as a gain of a case where the region was estimated to be the road surface R, there is a risk that the light receiving level is raised too much and becomes saturated. Thus, the gain is adjusted such that the light receiving level is lowered for the region which changes from the road surface R to the building B. Further, for a region newly estimated to be the road surface R, the gain is adjusted so as to raise the light receiving level. Then, the light receiving level of the region which remains to be estimated to be the road surface R is not changed (no gain adjustment). That is, the adjustment unit 22 adjusts the light receiving level (lowers the light receiving level) based on a light receiving amount of the light receiving unit with respect to at least a portion of a region the light receiving level is adjusted (raised) based on the map information 21a.

According to the present example, the sensor control device 2 is mounted in the vehicle C capable of acquiring the present location and controls the LiDAR 1 having the light source 11 which emits light to the predetermined region and the light receiving element 17 which receives reflected light of the emitted light, and the sensor control device 2 includes the adjustment unit 22 which acquires the map information 21a and adjusts a light receiving level of a light receiving signal of the light receiving element 17. The adjustment unit 22 determines a region for which the light receiving level with respect to the light receiving signal is to be adjusted based on the map information 21a. Consequently, it becomes possible to adjust the light receiving level for a region corresponding to a road in the predetermined region irradiated with light based on the map information 21a. Therefore, a detection accuracy can be improved even in a state where a peak power of reflected light of a road surface or the like is low.

Further, the adjustment unit 22 adjusts the light receiving level of the light receiving signal with respect to the region estimated to be the road based on the map information 21a. Thus, for the region estimated to be the road based on the map information 21a in the predetermined region irradiated with light, the light receiving level can be adjusted so as to be raised, for example. That is, practically, the light receiving sensitivity for the region estimated to be the road can be increased, thereby an accuracy of detection of the road surface or the like can be improved.

Further, the adjustment unit 22 adjusts the light receiving level based on the light receiving amount of the light receiving element 17 with respect to at least a portion of a region for which the light receiving level is adjusted based on the map information 21a. Thus, for example, since there may be a case when another vehicle or the like is detected in the region estimated to be the road surface R and the light receiving level may be saturated for the region where the another vehicle is detected, the light receiving level can be adjusted to be lowered so it is not saturated.

In the above-mentioned example, the map information 21a is stored in the storage device 21 of the sensor control device 2, however, the map information 21a may be downloaded from an external server or the like via communication when necessary, for example. By using the external server, it is sufficient to store only the map information 21a of a region which is necessary for traveling in the sensor control device 2, and it becomes possible to reduce memory capacity of the storage device 21.

Further, in the above-mentioned example, it is explained that the LiDAR 1 and the sensor control device 2 are configured as separate parts, however, the LiDAR 1 and the sensor control device 2 may be integrally configured.

Further, the present invention is not limited to the above-mentioned example. That is, a person skilled in the art can carry out the present invention in various variations within the scope of a main point of the present invention according to conventional knowledge. Such variations are, in so far as the sensor control device of the present invention is included therein, of course, within the scope of the present invention.

REFERENCE SIGNS LIST

1 LiDAR (sensor)
2 sensor control device (sensor)
11 light source (emitting unit)
12 light receiving element (light receiving unit)
21 storage device
21a map information
22 adjustment unit

The invention claimed is:

1. A sensor control device configured to be mounted in a mobile object capable of acquiring a current location and an orientation and configured to control a sensor having an emitting unit which emits light toward a predetermined region and a light receiving unit which receives reflected light of the emitted light, the sensor control device comprising:
   a map information acquiring unit acquiring map information including information regarding a road surface and corresponding to the current location and the orientation; and
   an adjustment unit adjusting a light receiving level of a light receiving signal of the light receiving unit,
   wherein the adjustment unit adjusts the light receiving level of the light receiving signal to be higher with respect to a region which is estimated to be the road surface based on the map information.

2. The sensor control device according to claim 1, wherein the adjustment unit adjusts the light receiving level based on a light receiving amount of the light receiving unit with respect to at least a portion of the region for which the light receiving level is adjusted again based on the map information.

3. A sensor control method executed by a sensor control device, the sensor control device being mounted in a mobile object capable of acquiring a current location and an orientation and configured to control a sensor having an emitting unit which emits light toward a predetermined region and a light receiving unit which receives reflected light of the emitted light, the sensor control method comprising:

a map information acquiring step of acquiring map information including information regarding a road surface and corresponding to the current location and the orientation; and an adjustment step of adjusting a light receiving level of a light receiving signal of the light receiving unit, wherein the adjustment step includes adjusting the light receiving level of the light receiving signal to be higher with respect to a region which is estimated to be the road surface based on the map information.

4. A non-transitory computer-readable medium having stored thereon executable instructions that, when executed by a computer, causes the computer to execute the sensor control method defined in claim 3.

* * * * *